Nov. 13, 1923.                                                          1,473,984
G. BAILHE
COMBINED BRAKE AND THROTTLE PEDAL
Filed Feb. 11, 1920
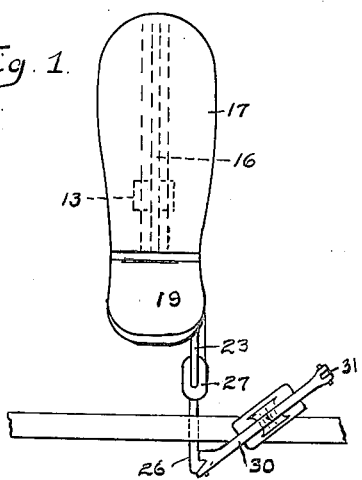
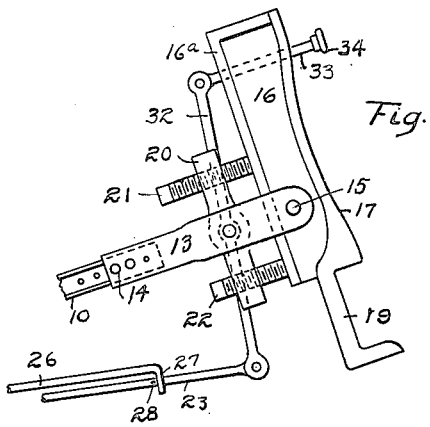
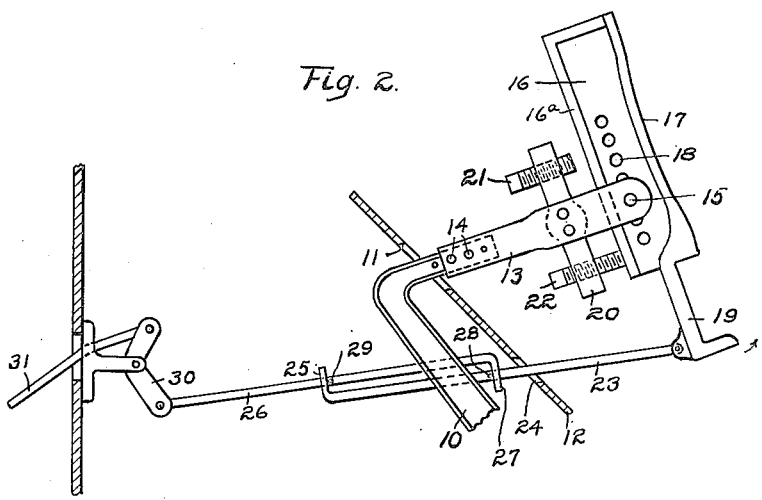
INVENTOR
George Bailhe
by Elwin M. Hulse
ATTORNEY.

Patented Nov. 13, 1923.

1,473,984

UNITED STATES PATENT OFFICE.

GEORGE BAILHE, OF FORT WAYNE, INDIANA.

COMBINED BRAKE AND THROTTLE PEDAL.

Application filed February 11, 1920. Serial No. 358,007.

*To all whom it may concern:*

Be it known that I, GEORGE BAILHE, a citizen of the United States, residing at Fort Wayne, in the county of Allen and State of Indiana, have invented new and useful Improvements in Combined Brake and Throttle Pedals, of which the following is a specification.

The invention relates to improvements in motor vehicles and is particularly directed to a combined brake and throttle pedal for such vehicles. The general practice in motor vehicle construction is to provide a foot pedal in front of the driver and secured to the brake lever by the movement forwardly of which by the driver's foot the brakes are applied. To enable the driver to control the speed of the vehicle without operating the hand lever at the steering wheel, a foot pedal, having a connection to the throttle of the carburetor, is provided at the foot board of the vehicle and adjacent the brake pedal, by the depression or movement forwardly of which the driver may open the throttle and cause an increased volume of gas to be supplied to the engine of the vehicle. The driver ordinarily maintains his foot on the throttle foot pedal, or accelerator pedal as it is commonly styled, while the vehicle is in motion and when he desires or is required to apply the brakes he must transfer his foot from the throttle pedal to the brake pedal. This transfer of the foot from one pedal to the other not only requires time but also is attended with delay, at times, in locating the brake pedal and of the danger of the foot slipping off the brake pedal if not properly seated thereon. Also, where the throttle pedal is close to the brake pedal, the driver may not properly seat his foot on the brake pedal so that the forward portion of the foot extends laterally from the pedal and when he moves the brake pedal the laterally extending portion of the foot contacts with and operates the throttle pedal with resultant injury. Many accidents are occasioned by the failure of the driver to promptly transfer his foot from the throttle pedal to the brake pedal; other accidents are occasioned by the failure of the driver to operate the proper pedal. In an emergency his intent is to apply the brakes but under the pressure of the moment he may operate the throttle pedal instead of the brake pedal and thereby increase the speed of the vehicle instead of checking it. All these circumstances and possibilities and dangers are well recognized by drivers generally as weaknesses in the operation of motor vehicles.

The object of the present invention is to eliminate the foregoing weaknesses and by taking advantage of the confused mental condition of a driver in an emergency resulting in the involuntary stiffening of his body and straightening out of his limb to control the speed of and stop the vehicle.

I accomplish the foregoing objects by providing a single pedal operable by one foot of the driver by the continuous movement of which in one general direction he may control the supply of fuel to the engine and stop the vehicle.

In the accompanying drawings I have illustrated the invention in simple form in which—

Figure 1 is a front elevational view of the pedal and throttle connections; Fig. 2 a side elevational view of the same and Fig. 3 a fractional side elevational view illustrating a modification of the invention.

Referring to the drawings 10 indicates the usual brake lever of a motor vehicle, the upper end of which projects through a slot 11 in a foot board 12 of the body of the vehicle. A sleeve 13 is adjustably secured by bolts 14 to the projecting end of the lever, its upper end being bifurcated and pivoted by pivot 15 to opposite sides of flange 16 of pedal 17, the bolt or pivot 15 being passed through any one of apertures 18 in flange 16. The tread of the pedal is formed to receive the foot of the driver of the vehicle so that it may rest thereon with utmost ease, the heel portion 19 being such as to support the foot with a high degree of comfort and to prevent the foot from slipping off the pedal. The pedal, being pivoted to the sleeve, may be oscillated in a vertical plane, and to limit and control the oscillation of the pedal a bar 20 is secured to sleeve 13 a suitable distance from the pivotal point of the pedal and adjusting screws 21 and 22 are carried in opposite ends of bar 20. The intended movement of the pedal is forwardly or toward the foot board or dash of the vehicle, hence screw 21 is adjusted at the desired distance from the normal position of base flange 16ᵃ of the pedal and screw 22 is adjusted to contact and engage said base flange in the normal inactive position of the pedal. The oscillation of the pedal forwardly therefore, is limited by screw 21 while screw 22 controls the normal inactive position of the pedal with respect to the sleeve.

Rod 23 is pivoted at one end to the under side of heel portion 19 of the pedal, the rod being extended through slot 24 in foot board 12 and its opposite or forward end has a right angular extension 25 provided with an opening in which rod 26 is slidably supported. The rear end of rod 26 has a similar right angular extension 27 at its rear end having an aperture in which rod 23 is slidably supported. In order that the two rods shall move longitudinally rearwardly as a unit but shall be capable of relative longitudinal movement in the opposite direction to collapse or telescope on each other, pin 28 is inserted in rod 23 forwardly of extension 27 and pin 29 is inserted in rod 26 rearwardly of extension 25. Hence any rearward movement of rod 23 carries rod 26 rearwardly since pins 28 and 29 prevent all relative movement of the rods in that direction of movement, but rod 23 is free to move forwardly on rod 26 at all times. The forward end of rod 26 is pivoted to one arm of lever 30 suitably pivoted behind the foot board 12. Rod 31 is pivoted to the other arm of the lever 30 and its opposite end is connected in the usual manner to the throttle of the carburetor for the engine (not shown).

It is apparent from the foregoing description that the driver will maintain his foot at all times on the pedal while the vehicle is in motion. If he desires more speed he moves the pedal forwardly on its pivot by his foot. This movement of the pedal moves the heel portion of the pedal rearwardly to cause rods 23 and 26 to move rearward as a unit to rock lever 30 in proper direction to cause rod 31 to open the throttle and admit more gas to the engine. While the pedal is in this position, and the driver must hold it there by his foot, if it becomes necessary to apply the brakes for any reason the driver merely moves the pedal forwardly in the usual manner, it being immaterial in what position the pedal may be with respect to the sleeve or brake lever. The forward movement of the pedal to apply the brakes causes rod 23 to slide forwardly on rod 26 thereby releasing its engagement with rod 26 and the spring usually associated with the throttle of the carburetor instantly restores the throttle, rod 31 and rod 26 to normal position. The forward movement of the pedal also rocks brake lever 10 in the usual manner to apply the brakes.

The pedal is pivoted on sleeve 13 so that it will be in substantial balance hence its oscillation is accomplished with a minimum of effort and without strain on the foot of the driver. The pedal is ever ready to be moved forwardly to rock the brake lever notwithstanding he may have oscillated it to control the speed of the vehicle, hence he can not make the mistake of operating the wrong pedal in attempting to apply the brakes on the vehicle. Errors are usually made in the excitement of an emergency and when such emergency arises the driver involuntarily stiffens his body, grasps the steering wheel with more energy and straightens out his limbs. By my invention, with his foot constantly on the pedal, this involuntary physical condition of the driver and the natural tendency to do something with his foot in an emergency, he will move the pedal forwardly and thereby release the throttle and apply the brakes, the pedal being moved continuously in one general direction and the movement being that to which the driver is accustomed. It is apparent that the pedal is operative in the same general direction for performing the three functions of increasing the speed, reducing the speed and applying the brakes and that the operation is continuous in that direction, hence no mistake can be made by the driver in applying the brakes since the movement of the foot in operating the pedal to apply the brakes also releases the throttle.

Another advantage of the pedal is that by reason of its flanges a large radiating surface is available to largely dissipate the heat of the engine and exhaust transmitted to it through the brake lever and through the slots in the foot board. The pedal is therefore more comfortable in warm weather than prior constructions of pedals.

In Figure 3 instead of pivotally connecting rod 23 to the heel portion of the pedal I pivotally connect its rear end to one end of lever 32 pivotally mounted on the sleeve or upon bar 20, a pin or rod 33 being pivoted at one end to the opposite end of lever 32 and its opposite end being extended through an opening in the tread of the pedal and carrying a knob or head 34. The driver having his foot on pedal 17 may cause the throttel to open by pressing down pin 33 to rock lever 32 and cause rods 23 and 26 to move rearwardly as before described. In applying the brakes the driver will move the pedal forwardly in the same direction as before thereby releasing rod 23 from rod 26 as before described and permitting the throttle to close. Adjusting screw 21 is adjusted into contact with the pedal in its normal inactive position so that there shall be no oscillation of the pedal on sleeve 13. Pin 33 may be omitted and screw 21 adjusted to permit of the oscillation of the pedal and provide engagement of the forward end of the pedal with the forward end of the lever 32 or screw 21, the operation of the lever 32 and rods 23 and 26 being the same as where rod 33 is used. I prefer, however, to connect rod 23 to the pedal as better results and more positive action initially of the throttle are obtained thereby than with either of the other arrangements just described.

What I claim is:

1. In a motor vehicle, a brake lever, a carburetor throttle operating lever, a foot pedal mounted on the brake lever, a push element having an operative connection to the throttle operating lever and arranged adjacent to the pedal and adapted to be engaged by the foot while resting on the pedal and depressed without moving the foot pedal for opening the throttle, and adapted to be simultaneously operated with the pedal by the foot for closing the throttle and applying the brakes.

2. In a motor vehicle, a brake lever, a carburetor throttle operating lever, a foot pedal mounted on the brake lever, a longitudinally reciprocable member extending loosely through the foot pedal and adapted to be depressed by the foot resting on the foot pedal independently of the operation of the brake lever, means connecting the reciprocable member and the throttle operating lever for actuating the latter lever to open the throttle when the member is depressed, said means being adapted to collapse, when the brake lever is depressed, to release the throttle operating lever.

3. In a motor vehicle, a brake lever, a carburetor throttle operating lever, a foot pedal mounted on the brake lever, a longitudinally reciprocable member extending loosely through the foot pedal and adapted to be depressed by the foot resting upon the foot pedal and independent of the depression of the brake lever, means pivotally connected to the brake lever and having connection with the reciprocable member and with the throttle operating lever, the said connection being adapted to collapse when the brake lever is depressed.

4. In a motor vehicle, a brake lever, a carburetor throttle-operating lever, a foot pedal mounted on the brake lever, a longitudinally reciprocable member extending loosely through the foot pedal and adapted to be depressed by the foot resting upon the foot pedal independently of the depression of the brake lever, a member pivoted on the brake lever having a connection to the reciprocable member and having a collapsible connection to the throttle operating lever, the independent movement of the reciprocable member causing the throttle operating lever to open the throttle and the depressing movement of the brake lever causing the collapsible connection to collapse to release the throttle-operating lever.

In witness whereof I have hereunto subscribed my name this 9th day of February, 1920.

GEORGE BAILHE.